Oct. 14, 1958   W. R. KANNE   2,856,341
NUCLEAR REACTOR SLUG PROVIDED WITH THERMOCOUPLE
Filed Aug. 13, 1945   2 Sheets—Sheet 1
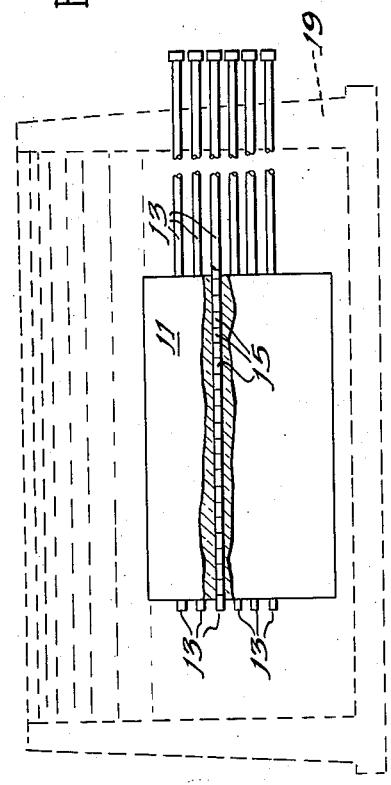
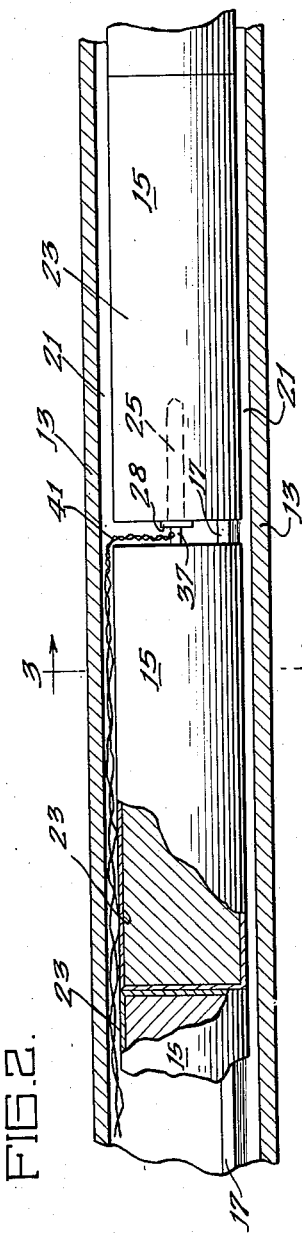
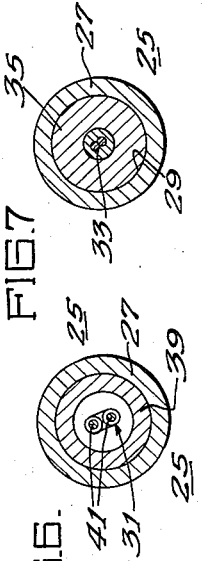
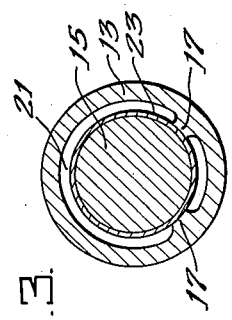
Witnesses:
Herbert E. Metcalf
Paul J. Glaister
Inventor:
William Rudolph Kanne
By Robert A. Saunders
Attorney Oct. 14, 1958 W. R. KANNE 2,856,341
NUCLEAR REACTOR SLUG PROVIDED WITH THERMOCOUPLE
Filed Aug. 13, 1945 2 Sheets-Sheet 2
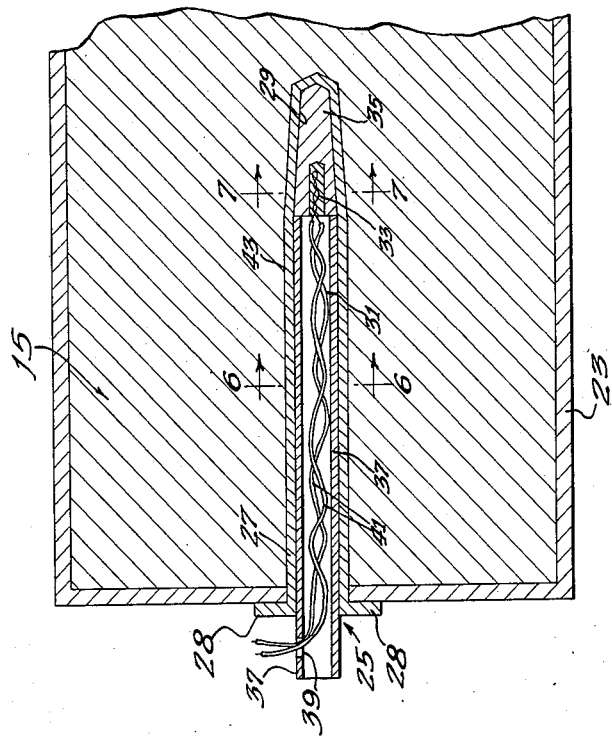
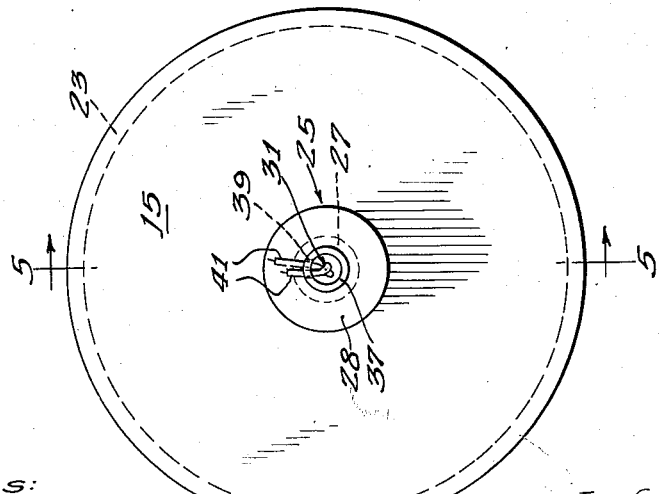
Witnesses:
Herbert E. Metcalf
Paul J. Glaister
Inventor:
William Rudolph Kanne
By Robert A. [Cavender]
Attorney

United States Patent Office 2,856,341
Patented Oct. 14, 1958

2,856,341

NUCLEAR REACTOR SLUG PROVIDED WITH THERMOCOUPLE

William Rudolph Kanne, Richland, Wash., assignor to the United States of America as represented by the United States Atomic Energy Commission Application August 13, 1945, Serial No. 610,604

2 Claims. (Cl. 204—193.2)

The present invention relates to temperature measuring apparatus for use in connection with slow neutron chain reacting systems, commonly referred to as neutronic reactors. More specifically, the invention is concerned with the provision of an improved thermocouple unit suitable for use in determining the internal temperature of the fissionable material or other reacting portions of a neutronic reactor.

The usual neutronic reactor comprises a plurality of reactive bodies or slugs or containing a fissionable material symmetrically disposed as a spatial lattice pattern in a suitable moderating material, such as graphite, heavy water or beryllium, for example, occupying the interstices of the lattice. The moderator has the function of slowing down the fast neutrons liberated during the fission process in order to make available a supply of slow neutrons sufficient to effect the continuance of the chain reaction.

In certain existing reactors of this type, the reactive bodies are constituted of uranium metal or other material containing known percentages of one or more of the fissionable isotopes, such as $U^{233}$, $U^{235}$, or $94^{239}$. The uranium or other reactive material is commonly formed into cylindrical slugs or rods, which preferably include a protective jacket or coating of aluminum or other suitable material having low neutron absorption characteristics. The coated or jacketed slugs or rods are contained within thin-walled, aluminum tubes having a somewhat greater cross-sectional area than the slug bodies, so as to provide an annular passageway about the slugs through which a cooling medium, such as water, can be circulated to remove the reaction produced heat.

Suitable means are provided in order to obtain uniform spacing of the slugs with respect to the walls of the tubes within which the slugs are contained. Conveniently, this means comprises longitudinally extending, spaced ribs or tracks which support the slugs from beneath, concentrically with the inner walls of the tubes. The slug-containing tubes extend longitudinally, in symmetrically spaced relation, through a body of moderating material, usually graphite. A detailed exposition of the operation of neutronic reactors and the various principles underlying their design and construction will be found in the co-pending application of E. Fermi and L. Szilard, Serial No. 568,904, filed December 19, 1944, now Patent No. 2,708,656, dated May 17, 1955, and which is assigned to the assignee of this invention.

The neutron density in a neutronic reactor is normally highest at the center thereof and least at the periphery. Similarly, the heat of reaction is normally greatest at the center. As a major proportion of the heat of reaction is liberated in the uranium bodies, it is clear that these uranium bodies are hotter than their surroundings, and normally hottest in the center of the reactor. The operating power can be stated to be proportional to the integrated neutron density (or heat release) throughout the reactor. It is clear that the permissible operating power level will depend on the temperature of the hottest slug, and this temperature must not exceed limits imposed by such considerations, for example, as a temperature creating injury to the jackets in air cooled reactors, or, as in the present instance, a slug temperature sufficiently high to boil the coolant adjacent the slugs. It is therefore essential that means be available for providing a continuous indication of the internal temperature of at least some of the reaction slug bodies at all times. The object of the present invention is to provide such means.

This object is accomplished by the provision of a thermocouple unit of novel and improved design, which is capable of use within a neutronic reactor or like device and which is operable to give a continuous and accurate indication of the internal slug temperatures. The features of one exemplary embodiment of the invention are illustrated in the accompanying drawings wherein:

Fig. 1 is a diagrammatical view, partially in section, showing the general features of a neutronic reactor of one type to which the present invention is applicable;

Fig. 2 is an enlarged, sectional view showing certain of the features of the slug-containing tubes of the reactor illustrated in Fig. 1, and illustrating a thermocouple device in accordance with the invention in use;

Fig. 3 is a sectional view on the line 3—3 of Fig. 2;

Fig. 4 is an enlarged, end elevation of a jacketed slug which is provided with a thermocouple temperature indicating device in accordance with the invention;

Fig. 5 is a fragmentary, sectional view on the line 5—5 of Fig. 4; and

Figs. 6 and 7 are sectional views on the line 6—6 and 7—7 of Fig. 5 drawn to a smaller scale.

The neutronic reactor illustrated very generally at 11 in Fig. 1 includes a plurality of horizontally extending tubes 13 which contain cylindrical slug bodies 15 of uranium or other reacting material. The tubes 13 are symmetrically disposed within channels extending through a body, or structure, of suitable moderating material, which is usually in the form of a sphere, cylinder, or parallelopiped, such as the rectangular block illustrated in Figure 1. The moderating material, as previously stated, serves the purpose of slowing the fast neutrons liberated during fission so as to make available a sufficient supply of slow neutrons to continue the chain reaction in the slug bodies of fissionable material contained within the reactor. The body of moderating material may be built up from blocks, which is a most convenient arrangement when graphitic carbon, beryllium, or other solid moderating material is being utilized, or it may be contained in a tank of suitable dimensions when a liquid moderator, such as heavy water, is being used. The reacting section of the reactor normally comprises a generally spherical or cylindrical central portion of the body of moderating material. The reactor system may include a neutron reflecting shield, not specifically illustrated, disposed about the reacting portion, and the complete system may conveniently be located within a water-filled concrete structure, as outlined generally at 19, which acts as a neutron absorbing, protective shield.

In Figs. 2 and 3, there is a somewhat more detailed showing of the structure of the individual tubes 13 and of the cylindrical slug bodies 15 contained therein in end to end axial alignment. Each of the tubes 13 extends the full length of the reactor, and comprises a thin-walled, metallic tube, preferably of aluminum or other material having low neutron absorbing characteristics, and each tube 13 is provided with two, internally disposed, radially spaced, parallel ribs 17 arranged to engage and support the slugs 15 of reacting material concentrically within the tube. A suitable cooling medium is circulated through the annular space 21 thereby provided between the slug bodies 15 and the inner surface of the tube 13.

Each of the slugs 15 includes a thin, can-like, outer covering or container 23 of aluminum or other material having low neutron absorption. The covering 23 completely encloses the inner body of the slug, and has the dual function of protecting the reacting metal from corrosion and of preventing contamination of the cooling medium with radioactive fission products. The reactor structure includes means, not specifically illustrated, for circulating water or other cooling medium through the annular space 21 provided about the reacting slugs 15.

One of the slugs 15 illustrated in Fig. 2 is provided with a thermocouple unit 25 in accordance with the invention for providing a continuous indication of the internal slug temperature. The details of this thermocouple unit are shown particularly in Figs. 4 to 7. The device includes a thin-walled outer tube 27 closed at its inner end, open at the other end, and is provided with a flange 28 at the open end. The outer tube 27 is made of aluminum or other material having low neutron capture cross-section. The inner end portion 29 of the tube 27 is tapered for about one-quarter the length of the tube, as illustrated particularly in Fig. 5.

The thermocouple 31 constituting a part of the unit 25 may be of any suitable type. Very satisfactory results have been obtained with iron-constantan thermocouples. Copper-iron, platinum-rhodium, and bismuth-antimony combinations are also suitable. Desirably, the thermocouple materials should have a melting point well above any temperature which may be reasonably encountered during use.

The junction 33 of the thermocouple 31 is thermally and mechanically bonded to a tapered plug 35 which is affixed to one end of a driving tube 37, which facilitates the handling of the tapered plug 35. The other end of the driving tube 37 is provided with an opening 39 in the side thereof through which the insulated lead-wires 41 of the thermocouple extend. The bond between the thermocouple junction 33 and the tapered plug 35 may be effected by silver-soldering, by welding, or by any suitable press fitted or peened connection. The tapered plug 35 should be of material having low neutron capture cross-section and high thermal conductivity, aluminum or an aluminum alloy being particularly suitable. The dimensions of the tapered plug 35 are such that when it is driven into the inner end portion 29 of the tapered outer tube 27, it will engage the walls of the tube with a press-fit, thereby producing a high thermal conductivity bond between the plug and the tube 27 and a similar bond through the tube 27, which extends into the body of the slug 15, with the inner portion of the slug body.

During installation of the unit, the outer tube 27 is driven into a suitable cylindrical opening 43 drilled into one end of the slug which is selected for temperature measurement purposes. The dimensions of the opening 43 are such that the outer walls of the tube 27 will engage the slug body 15 with a press-fit thereby producing a good thermal bond. The flange 28 on the outer end of the tube 27 should be driven snugly against the end of the slug so that the tube 27 will act as a continuation of the protective coating 23 on the slug 15 in the region where the thermocouple unit enters the slug. In certain instances, it may be desirable or necessary to mechanically bond the flange 28, as by welding, to the protective covering 23 disposed about the slug body. The flange 28 is made of relatively large diameter to facilitate this.

After the outer tube 27 has been driven into place within the slug body, the inner section of the thermocouple unit, which consists of the tapered plug 35, the thermocouple junction 33, the lead-wires 41, and the driving tube 37, are placed within the outer tube 27 and driven into place. As previously stated, the dimensions of the tapered plug 35 and the tapered inner end portion 29 of the tube 27 are such that a very tight press-fit, with resulting high thermal conductivity between the thermocouple junction 33 and the slug body 15, is obtained.

In one satisfactory embodiment of the thermocouple unit of the invention, which has been used in connection with a reactor of the type previously described, the outer tube 27 had a length of approximately 2 inches, an external diameter of .20 inch, an internal diameter of .16 inch, and a wall thickness of .02 inch. The inner end portion 29 was tapered on the outer surface over a length of .50 inch, and the amount of taper was 1° with respect to the longitudinal axis of the tube. The flange 28 in this embodiment of the invention had a diameter of .50 inch, and the tapered plug 35 was .50 inch long.

Any number of the slug bodies 15 in any particular reactor may be equipped with a thermocouple unit of the type as described above, and during the charging of the reactor, these slugs should be introduced into such of the slug containing tubes 13 (Fig. 1) and at such point in the charging operation that the thermocouple-containing slugs will be located within the reactor in those regions where it is desired to ascertain the slug temperatures. Normally, the thermocouple unit or units 25 will be located more or less centrally of the reactor since, as pointed out above, the neutron density and the internal heating of the slugs is usually greatest in this region. The length of the driving tube 37 is greater than the length of the outer tube 27, in order that the outer end of the driving tube will project a sufficient distance to provide spacing between slugs containing a thermocouple unit, and the adjacent slugs. This in combination with the side opening 39 in the driving tube 37 permits the thermocouple lead-wires 41 to be brought out of the slugs without danger of their being cut-off. The lead-wires 41 are brought out of the reactor through the annular space 21 through which the cooling medium is circulated.

In the foregoing, there has been described a new and improved means for determining the internal temperatures within the reactive slug bodies of a neutronic reactor or like apparatus. The particular structure described is, of course, merely illustrative and it will be apparent that other devices may be constructed in accordance with the principles which have been disclosed. The apparatus makes possible the obtaining of measurements which are of great value in connection with the satisfactory operation of neutronic reactors, and solves a problem which has proven most troublesome in the art. Thus, accurate measurements of slug temperature are obtained without introducing excessive neutron absorbing material into the reactor, thereby varying the characteristics of the reactor to a minimum degree. The features of the invention which are believed to be new, are expressly pointed out in the appended claims.

What is claimed is:

1. In combination, a slug assembly having a body of material fissionable by neutrons of thermal energy and a thin protective coating disposed about said body, said slug assembly being provided with a centrally disposed passageway extending therein, and a thermocouple unit comprising a first tube sealed at one end constructed of a material of high thermal conductivity and provided with a flange at the other end, said tube being disposed within the passageway of the body with the flange in physical contact with the protective coating on the body sealing the material in the body from the ambient atmosphere, a plug of high conductivity metal press fitted into the closed end of the first tube, a second tube disposed within the first tube having a portion extending exterior to said first tube with an orifice in the side of said portion, and a thermocouple having a junction thermally and mechanically bonded to said plug, the lead wires of said thermocouple extending to the exterior of the thermocouple unit through said second tube and orifice therein, whereby the second tube is adapted to contact an adjacent body and protect the lead wires from mechanical damage caused by pressure exterted from the adjacent body.

2. In combination, a cooling tube for a neutronic reactor having a plurality of slugs therein, and at least one slug assembly disposed within said tube, said assembly having a body of material fissionable by neutrons of thermal energy and a thin protective coating disposed about said body, said slug assembly being provided with a centrally disposed passageway extending therein, and a thermocouple unit comprising a first tube sealed at one end constructed of a material of high thermal conductivity and provided with a flange at the other end, said tube being disposed within the passageway of the body with the flange sealed to the protective coating on the body, a plug of high thermal conductivity material snugly fitted into the closed end of the first tube, a second tube disposed within the first tube having a portion extending exterior to said first tube with an orifice in the side thereof, and a thermocouple having a junction thermally connected to the plug, the lead wires of said thermocouple extending to the exterior of the thermocouple unit through the second tube and the orifice therein, whereby the second tube is adapted to contact an adjacent body and protect the lead wires from mechanical damage caused by pressure exerted from adjacent slugs.

References Cited in the file of this patent

UNITED STATES PATENTS

| | | |
|---|---|---|
| 1,581,380 | Brown | Apr. 20, 1926 |
| 1,615,503 | Brown | Jan. 25, 1927 |
| 1,651,750 | Brophy | Dec. 6, 1927 |
| 1,660,504 | Grubb | Feb. 28, 1928 |
| 2,012,112 | States | Aug. 20, 1935 |
| 2,054,120 | De Florez | Sept. 15, 1936 |
| 2,071,531 | Hulme | Feb. 23, 1937 |
| 2,161,432 | Rees | June 6, 1939 |
| 2,323,715 | Kuehni | July 6, 1943 |
| 2,371,288 | Frownfelter | Mar. 13, 1945 |
| 2,381,058 | Jones | Aug. 7, 1945 |
| 2,465,981 | Robertson | Mar. 29, 1949 |

FOREIGN PATENTS

| | | |
|---|---|---|
| 114,151 | Australia | May 3, 1940 |
| 233,011 | Switzerland | Oct. 2, 1944 |

OTHER REFERENCES

Smyth Report, "Atomic Energy for Military Purposes," August 1945; copy may be purchased from Supt. of Doc., Washington, D. C.

A General Account of the Development of Methods of Using Atomic Energy for Military Purposes, by H. D. Smyth, August 1945, pages 82–84.

Kelly et al.: Physical Review, 73, 1135–9 (1948).